(12) United States Patent
Seth

(10) Patent No.: US 7,052,565 B2
(45) Date of Patent: May 30, 2006

(54) WEB CONSTRUCTIONS WITH SEVERED ELONGATE STRANDS

(75) Inventor: Jayshree Seth, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 280 days.

(21) Appl. No.: 10/351,907

(22) Filed: Jan. 27, 2003

(65) Prior Publication Data

US 2004/0143942 A1  Jul. 29, 2004

(51) Int. Cl.
*B32B 31/18* (2006.01)
*B32B 31/30* (2006.01)

(52) U.S. Cl. ............... 156/66; 156/178; 156/205; 156/253; 156/270; 156/244.19

(58) Field of Classification Search .......... 156/66, 156/176, 177, 178, 207, 253, 270, 244.18, 156/244.19, 244.25, 205, 229, 252, 269, 156/292; 428/99, 100, 182; 24/442, 447
See application file for complete search history.

(56) References Cited

U.S. PATENT DOCUMENTS

| | | | |
|---|---|---|---|
| 2,717,437 A | 9/1955 | Mestral | |
| 3,114,951 A | 12/1963 | Mestral | |
| 3,136,026 A | 6/1964 | Mestral | |
| 4,056,593 A | 11/1977 | de Navas Albareda | |
| 4,861,399 A * | 8/1989 | Rajala et al. | 156/86 |
| 4,959,265 A | 9/1990 | Wood et al. | |
| 5,077,870 A | 1/1992 | Melbye et al. | |
| 5,256,231 A | 10/1993 | Gorman et al. | |
| 5,393,475 A | 2/1995 | Murasaki et al. | |
| 5,611,791 A | 3/1997 | Gorman et al. | |
| 5,681,302 A | 10/1997 | Melbye et al. | |
| 5,884,374 A | 3/1999 | Clune | |
| 6,205,623 B1 * | 3/2001 | Shepard et al. | 24/30.5 R |
| 2001/0016245 A1 | 8/2001 | Tuman et al. | |
| 2001/0018110 A1 | 8/2001 | Tuman et al. | |
| 2001/0042591 A1 * | 11/2001 | Miner et al. | 156/252 |

FOREIGN PATENT DOCUMENTS

| | | |
|---|---|---|
| EP | 0 341 993 B1 | 11/1989 |
| JP | 9-19309 | 1/1997 |
| WO | WO 99/01048 | 1/1999 |
| WO | WI 00/44971 | 8/2000 |
| WO | WO 01/47697 A1 | 7/2001 |
| WO | WO 02/14701 A2 | 2/2002 |
| WO | WO 02/14701 A3 | 2/2002 |
| WO | WO 02/45536 A2 | 6/2002 |

* cited by examiner

*Primary Examiner*—Gladys JP Corcoran
(74) *Attorney, Agent, or Firm*—Kevin W. Raasch; William J. Bond

(57) ABSTRACT

Web constructions with severed elongate strands located on at least one surface are described. The severed elongate strands are attached to one or both major surfaces of a web and may be arranged in rows and columns. The elongate strands may be formed by extruding continuous strands onto a web construction, followed by selective attachment of the strands to the web at intervals. After attachment, the elongate strands may be severed at locations between the points of attachment. The severed elongate strands may be used as fastening elements on a web backing. When used as fastening elements, the webs may be used in, e.g., garments (gowns diapers, training pants, etc.), bedding, etc. Other uses may also be envisioned for the webs with severed elongate strands, e.g., personal care products (skin debridement articles, etc.), abrasive articles, polishing articles, filters constructions (where, e.g., the severed elongate strands serve as filtering elements and/or spacers), etc.

24 Claims, 6 Drawing Sheets

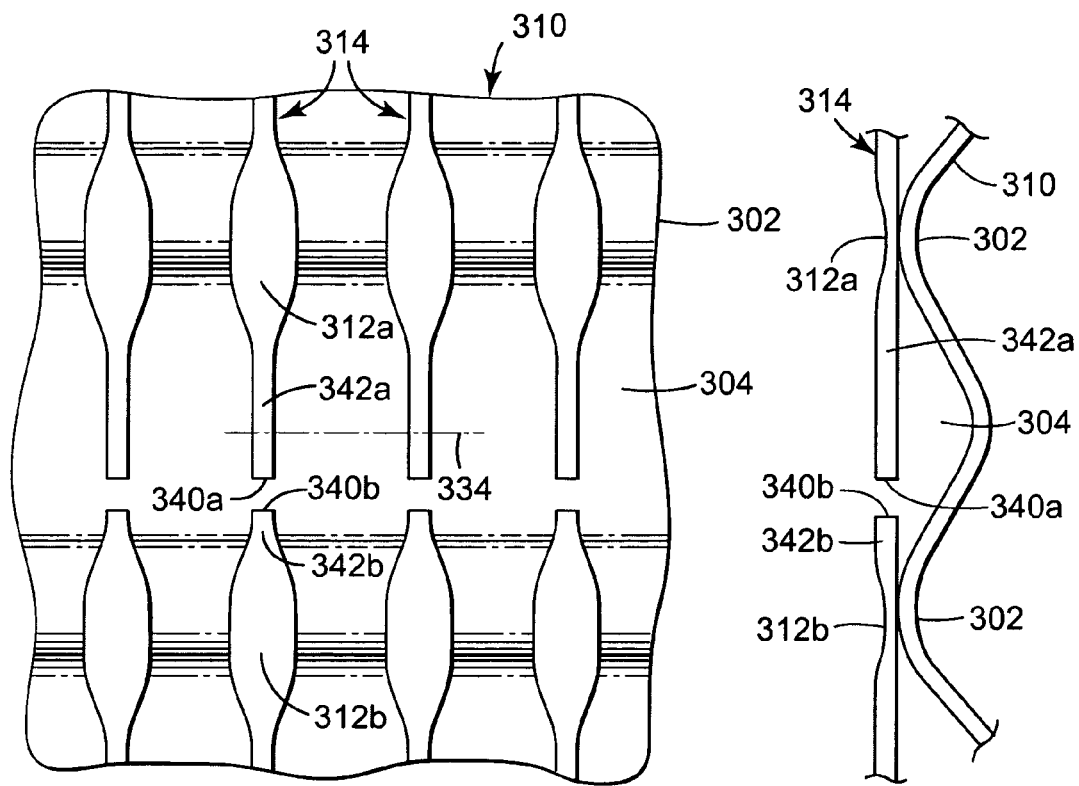
*FIG. 7A*  *FIG. 7B*
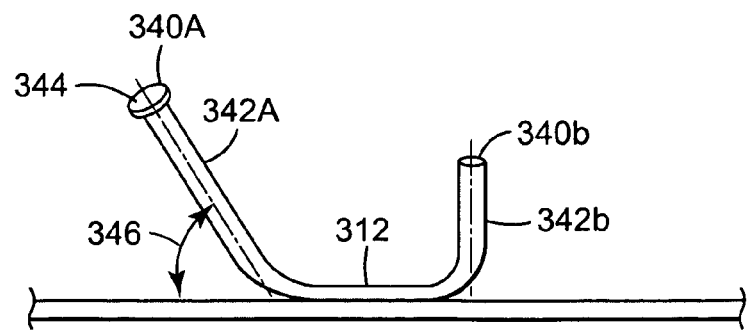
*FIG. 8*

WEB CONSTRUCTIONS WITH SEVERED ELONGATE STRANDS

BACKGROUND

Stemmed webs, such as those used to form hook-and-loop fasteners, have been in use for a number of years. These webs typically include stems that are secured to the web and formed into hooks configured to interlock with a corresponding loop material. As used herein, small protrusions capable of engaging small loops or a mesh of, for example, woven fabric or nonwoven fibers will be referred to as hooks whether or not they are actually in the shape of hooks, i.e., they may form other non-hook shapes. A common hook shape is that of a mushroom which may engage loops or other hooks.

U.S. Pat. Nos. 4,056,593, 4,959,265, and 5,077,870 disclose methods of forming polymeric stemmed webs. In these documents, a thermoplastic resin may be extruded into a tool having an array of cavities. Upon separation from the tool, the thermoplastic resin forms an array of stems. The stems may be subsequently calendered or otherwise manipulated to produce a broader head at the top of the stems. The shape, dimensions, and angularity of the heads, as well as the stem density, determine the ease of capture and tenacity of hold to the loop.

Similarly, U.S. Pat. No. 5,393,475 discloses a method of making a stemmed web with stems on both major surfaces of the web. This document discloses extruding one or more different materials to form base portions. Hooks are formed by allowing the material(s) to fill cavities on two rollers between which the material(s) pass.

Published U.S. patent applications US2001/0018110-A1 and US2001/0016245-A1 disclose web materials having numerous discrete regions or patches spaced apart from one another on at least a first side of the web. These documents disclose numerous stems extending outwardly from each patch. Methods of producing such web constructions are also disclosed. The discontinuous fastener patches may function as the male component of a hook-and-loop refastenable mechanical fastener. The web constructions are produced by fusing a discrete quantity of polymeric material to the web and forming the stems in discrete quantities in each patch.

SUMMARY

The present invention provides web constructions with severed elongate strands located on at least one surface. The severed elongate strands are attached to one or both major surfaces of the web and may be arranged in rows and columns.

The elongate strands may be formed by extruding continuous strands onto a web construction, followed by selective attachment of the strands to the web at intervals. After attachment, the elongate strands may be severed at locations between the points of attachment.

The severed elongate strands may be used as fastening elements on a web backing. The fastening elements may include hooks or shaped heads that may fasten to a loop material or other shaped fastening elements. In other instances, the fastening elements may fasten under shear forces (i.e., forces generally parallel to the surface of the web). When used as fastening elements, the webs of the present invention may be used in, e.g., garments (gowns diapers, training pants, etc.), bedding, etc. Other uses may also be envisioned for webs with severed elongate strands, e.g., personal care products (skin debridement articles, etc.), abrasive articles, polishing articles, filters constructions (where, e.g., the severed elongate strands serve as filtering elements and/or spacers), etc.

In one aspect, the present invention provides a method of making a web construction with severed elongate strands. The method includes providing a backing with two opposing major surfaces, the backing having alternating ridges and grooves on one major surface of the two opposing major surfaces; attaching a plurality of elongate strands to two or more ridges of the alternating ridges and grooves; and severing the plurality of elongate strands at locations between the two or more ridges to form severed elongate strands.

In another aspect, the present invention provides a method of making fastening elements by providing a backing with two opposing major surfaces, the backing having alternating ridges and grooves on one major surface of the two opposing major surfaces; attaching a plurality of elongate strands to two or more ridges of the alternating ridges and grooves, wherein the plurality of strands are attached to at least one of the major surfaces of the backing; and severing the plurality of elongate strands at locations between the two or more ridges to form fastening elements, wherein each fastening element includes an anchor portion attached to the backing, at least one severed elongate strand protruding from the anchor portion, and a severed distal tip on the at least one elongate strand.

In another aspect, the present invention provides a method of making fastening stems for use with a hook-and-loop fastener. The method includes corrugating a backing to form a plurality of alternating ridges and grooves on a first major surface of the backing; extruding a plurality of elongate strands onto the first major surface of the backing, wherein each of the plurality of elongate strands attach to the backing at anchor portions, the anchor portions located on or near some or all of the ridges of the plurality of alternating ridges and grooves, wherein most or all of the plurality of elongate strands span the grooves of the plurality of alternating ridges and grooves; severing the plurality of elongate strands between adjacent ridges of the plurality of alternating ridges and grooves, where a plurality of severed elongate strands are formed; and flattening the backing, wherein the plurality of severed elongate strands form fastening stems attached to the backing.

In another aspect, the present invention provides an apparatus for producing a web having severed elongate strands thereon. The apparatus includes two or more corrugating rollers operable to produce a corrugated backing; an extruding apparatus associated with and positioned downstream of the two or more corrugating rollers, the extruding apparatus operable to extrude one or more elongate strands onto the corrugated backing; and a severing device associated with and positioned downstream of the extruding apparatus, the severing device operable to sever the one or more elongate strands.

In another aspect, the present invention provides a web construction including a backing having a plurality of alternating ridges and grooves on a first major surface; and a plurality of severed elongate strands attached to two or more ridges of the plurality of alternating ridges and grooves.

In another aspect, the present invention provides a web construction including a backing having a first major surface; and a plurality of severed elongate strands arranged in successive rows on the first major surface of the backing, wherein each of the severed elongate strands protrudes from an anchor portion attached to the first major surface of the backing, and wherein each of the severed elongate strands has a severed distal tip.

The above summary is not intended to describe each embodiment or every implementation of the present invention. Rather, a more complete understanding of the invention will become apparent and appreciated by reference to the following detailed description and claims in view of the accompanying figures.

BRIEF DESCRIPTION OF THE FIGURES

The present invention will be further described with reference to the views of the drawing, wherein:

FIG. 7A is a partial bottom plan view of the composite web of FIG. 4A illustrating severed elongate strands in accordance with another embodiment of the invention;

FIG. 7B is a side elevation view of the composite web of FIG. 7A;

FIG. 8 is a partial, enlarged side elevation view of a composite web including an exemplary fastening element.

DETAILED DESCRIPTION OF EXEMPLARY EMBODIMENTS

Figure 1:
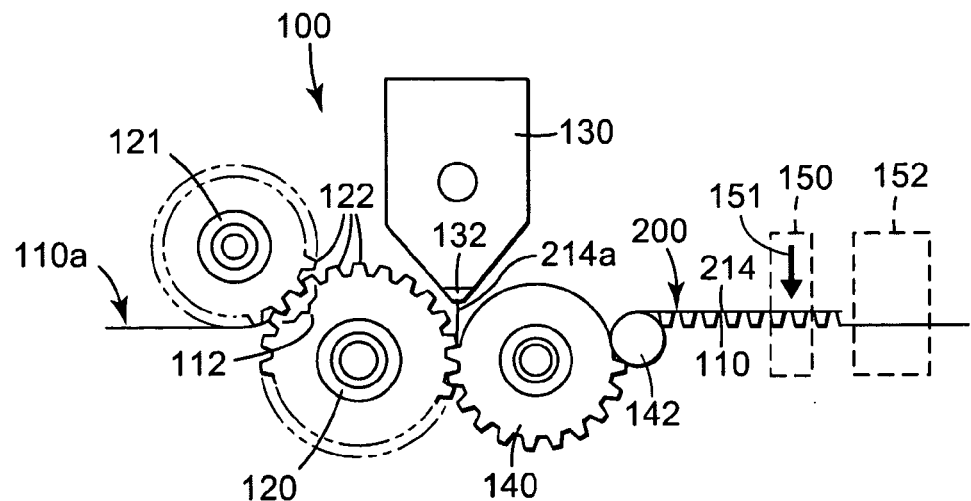
FIG. 1 is a diagrammatic view illustrating one exemplary apparatus in accordance with the present invention.

In the following detailed description of exemplary embodiments, reference is made to the accompanying figures of the drawing which form a part hereof, and in which are shown by way of illustration specific embodiments in which the invention may be practiced. It is to be understood that other embodiments may be utilized and structural changes may be made without departing from the scope of the present invention.

Generally speaking, the present invention is directed to a sheet-like composite web having a backing and severed elongate strands attached thereto, and methods/apparatus for making the same. Such composite webs may be used in the production of various items such as garments (e.g., gowns diapers, training pants, etc.), bedding, personal care products (skin debridement articles, etc.), abrasive articles, polishing articles, filters constructions (where, e.g., the severed elongate strands serve as filtering elements and/or spacers), etc.

FIG. 1 schematically illustrates a method and apparatus 100 for making a composite sheet or web 200 in accordance with one embodiment of the present invention. The composite web 200 is illustrated in more detail in FIGS. 2, 3A, and 3B. The apparatus 100 of FIG. 1 may receive a first sheet or backing 110a of flexible material. A series of generally parallel, alternating ridges 202 and grooves 204 (best shown in FIG. 2) may be formed in the backing 10a to provide a shaped backing 110.

Where beneficial to an understanding of the present invention, the backing is referred to herein in its initial form as "backing 110a" and in its shaped, e.g., corrugated form, as "shaped backing 110." No other distinction is intended by the use of these different terms. As used herein, the term "corrugated" refers to any deformation of the backing that produces alternating peaks and valleys, e.g., alternating ridges and grooves, of any suitable size and/or shape on at least a first major surface of the backing. The second major surface of the backing may have a shape that is complementary to the corrugated first major surface (as shown), or it may have a shape different from the first major surface, e.g., flat, etc.

The backing 110a may be formed from any suitable perforated or non-perforated material. For example the backing may be a sheet or web of fibrous material such as a nonwoven material, knit material, woven material, etc., or combinations thereof. Alternatively, the backing may be a non-fibrous material, e.g., polymeric film, foil, etc., or combinations thereof. In other instances, the backing may be a composite of different layers (continuous or discontinuous) attached (e.g., laminated, point bonded, etc.) to form a unitary sheet or web. As a whole, the backing 110a may be impermeable or foraminous as desired.

In certain embodiments, the backing 110a may preferably be a conventional nonwoven fibrous web or a multi-layer composite including nonwoven webs or materials; for example carded webs, spunlaced webs, melt-blown webs, Rando webs, laminates thereof, or other materials as described in, e.g., International Publication No. WO 00/44971 (PCT/US99/10243). Also, relatively strong nonwovens such as spunbond-type webs or other highly consolidated webs may be used. The fibers forming the nonwoven material could be formed of natural or synthetic fibers such as polypropylene, polyethylene, polyester, nylon, cellulose, or polyamides, or combinations of such materials, such as a multicomponent fiber (e.g., a core/sheath fiber such as a core of polyester and a sheath of polypropylene which provides relatively high strength due to its core material and is easily bonded to polypropylene strands due to its sheath material). Fibers of different materials or material combinations may also be used in the same backing of nonwoven material.

Regardless of their construction, backings 110a used in connection with the present invention are constructed of materials that are capable of bonding with the elongate strands 214a. In some instances, the materials in the backing 110a and the strands 214a may be polymers that bond together by intermixing of the same or different polymers under the bonding conditions (e.g., heat, pressure, solvents, etc. and combinations thereof). In other instances, the bonds may be interpenetration-type bonds in which polymeric material penetrates into structures to bond the two components. For example, if the elongate strands 214a are polymeric materials and the backing 110a is a porous (e.g., fibrous) structure, the polymeric material of the strands 214a may penetrate into the openings of the backing (e.g., the interstices between fibers if the backing is fibrous).

In some embodiments, the backing 110a may preferably include polymeric material in sufficient amounts to bond with the strand material 214a at, e.g., the temperature of the extrudate or at a different bond temperature. In some instances, the backings may preferably be manufactured with a layer of nonwoven material including fibers of the same type of polymer as the extruded strand material to enhance bonding of the nonwoven material to the strands. Manufacturing the articles of the present invention from the same or similar materials may, e.g., offer an advantage such as simplifying recycling.

For example, in one embodiment, a backing 110 of flexible nonwoven material would be formed (in whole or in part) of polypropylene fibers with the strands 214 also formed of polypropylene, thus potentially increasing anchor strength between the strands 214 and the backing 110. In other embodiments, it may be preferred that both the strands and at least a portion of the backing fibers are polyolefin materials.

Figure 2:
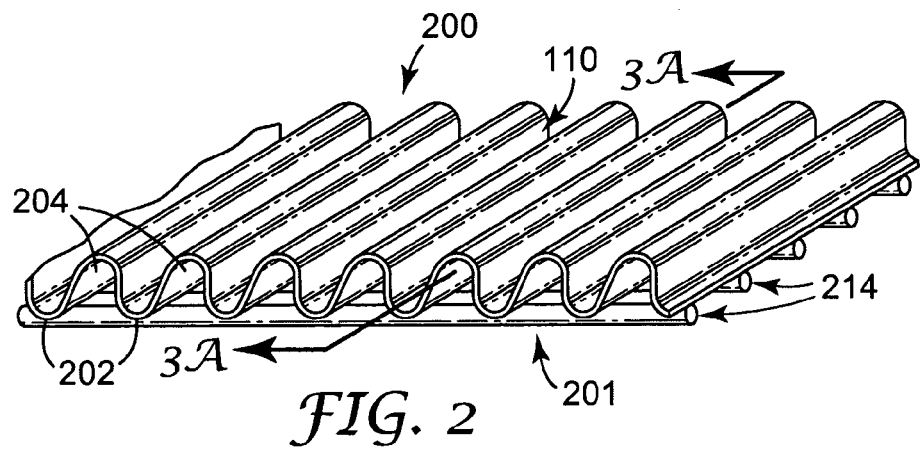
FIG. 2 is a perspective view of an exemplary composite web in accordance with the present invention (before severing of the strands)

Elongate strands of material 214 may be attached to some or all of the alternating ridges 202 of the shaped backing 110 as shown in FIG. 2. In the depicted embodiment, the strands 214 are formed by extruding spaced, preferably generally parallel, elongate strands 214a of molten polymeric material as shown in FIG. 1. When solidified, these strands 214a attach to and extend between the ridges 202 of the shaped backing 110. That is, the strands 214 attach to the backing 110 in such a way that the arcuate portions of the backing 110 project from corresponding elongate first surface portions 218 (see FIG. 4B) of the strands 214. If the strands 214 are formed of thermoplastic materials and the backing 110 includes thermoplastic materials, the strands 214a may be described as thermally bonding to the ridges 202.

If the backing 110a is provided as a flat sheet or web, the apparatus 100 may include first and second corrugating members 120 & 121 to form the backing 110a. The corrugating members 120 & 121 may be generally cylindrical rollers each having parallel axes of rotation and a multiplicity of ridges or teeth 122 along their respective peripheries. The teeth 122 have spaces therebetween operable to receive the teeth 122 of the other corrugating member along a meshing portion 112.

A motor or other device may be used to rotate the members 120 & 121 so that when the backing 110a is fed between the meshing portion 112 of the teeth 122, the backing 110a generally conforms to the periphery of the members 120 and 121 to form arcuate portions in the spaces between the teeth 122 of the first corrugating member 120, and anchor portions 212 along the outer surfaces of the teeth 122 of the first corrugating member 120.

The corrugating members 120 and 121 may include optional features to assist in retaining the shape of the backing 110. For example, the surface of the first corrugating member 120 may be roughened (e.g., by sand blasting or chemical etching), vacuum-ported, and/or heated. Such characteristics may assist the first corrugating member 120 in retaining the backing 110 along its periphery for a predetermined distance beyond the meshing portion 112 of the teeth 122.

The apparatus 100 depicted in FIG. 1 also includes an extruder 130 operable to feed a user-selectable strand die 132. The strand die 132 may include spaced openings (not shown) for extruding strand material (e.g., polyester, polystyrene, polyolefin, nylons, coextruded materials or the like) to form numerous, elongate molten strands 214a of material extending in a generally parallel, spaced-apart relationship.

Once solidified, the strands 214 are formed as illustrated in FIG. 2. After solidification, the strands 214 may exhibit elastic or inelastic properties.

The strand die 132 is preferably operable to position the molten strands 214a onto the ridges 202 of the shaped backing 110 along the periphery of the first corrugating member 120 at a predetermined distance from the meshing portion 112 of the teeth 122.

Each of the strands 214 may be formed by extruding a generally constant volumetric flow from the strand die 132 onto the backing 110, which itself preferably moves at a constant rate of speed. That is, a constant linear volume of strand material may flow to form each strand 214. As a result, strands 214 may have a generally uniform volume of strand material along their lengths (even though the cross-sectional profile of the strand 214 may change along its length as seen in, e.g., FIGS. 3B & 4A). Furthermore, the strands 214 may preferably all be formed with the same dimensions, although in some embodiments strands may be formed with different dimensions, e.g., some strands may be thicker or thinner than adjacent strands.

The dimensions of the strands may be easily varied by changing the pressure in the extruder 130 (e.g., by changing the extruder screw speed or type); changing the speed at which the first corrugating member 120, and thereby the backing 110, is moved (i.e., for a given rate of output from the extruder 130, increasing the speed at which the backing 110 is moved will decrease the diameter of the strands 214, whereas decreasing the speed at which the backing 110 is moved will increase the diameter of the strands 214); changing the dimensions of the spaced die openings, etc.

The strand die 132 may be easily interchangeable such that strands 214 of different configurations, e.g., different diameters and different spacing, can be formed. Selectively adjustable spacing and/or diameters for the openings along the length of the strand die 132 may, for example, allow change in strand strength at various locations across the backing 110, and/or change in anchorage of the backing 110a to the strands 214. The strand die 132 may also be selected to form strands of other configurations, e.g., hollow strands, strands with shapes other than round (e.g., square, rectangular, oval, triangular, star, "+" shaped, etc.), or bi-component strands.

In certain alternative embodiments, an extruder and die may not be provided. The elongate strands 214 may be pre-formed and fed into the nip formed by the first corrugating member 120 and the second corrugating member 121. One or both of the corrugating members 120 & 121 may be heated so that the pre-formed strands 214 are softened or melted and attached to the ridges 202 as described above. Alternatively, preformed strands may be provided after the backing 110a has passed through corrugating member 120 and 121, with attachment being performed using a different roll positioned to form a nip opposite, e.g. corrugating roll 120. These preformed strands can be used in any of the contemplated embodiments of the invention where strands are provided by extrusion.

A cooling apparatus, e.g., a generally cylindrical cooling roller 140 powered for rotation about a rotational axis parallel with the axis of the corrugating members 120 and 121, may also be provided. The periphery of the cooling roller 140 may be closely spaced from and define a nip with the periphery of the first corrugating member 120 at the predetermined distance from the meshing portion 112 of the teeth 122.

A nip roll 142 for holding the composite web 200 on the cooling roller 140 for a predetermined distance around its periphery may also be provided. Prolonged contact with the cooling roller 140 may permit the strands 214 to more effectively cool and solidify before undergoing subsequent processes.

A severing device 150 may preferably be included in apparatus 100. The severing device may sever the strands of material 214 as further described below. A stretching or flattening apparatus 152 may further be provided to stretch the composite web 200 into a more flattened, sheet-like configuration.

Other features of the apparatus 100 that are either understood by those of skill in the art or are not necessary to an understanding of the invention may also be included but may not be further illustrated and/or discussed herein.

Figure 3A:
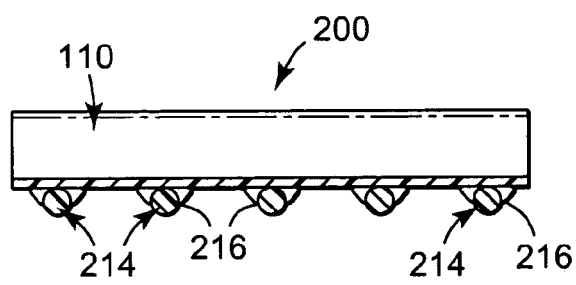
FIG. 3A is a partial enlarged section view taken approximately along line 3A—3A of FIG. 2.
Figure 3B:
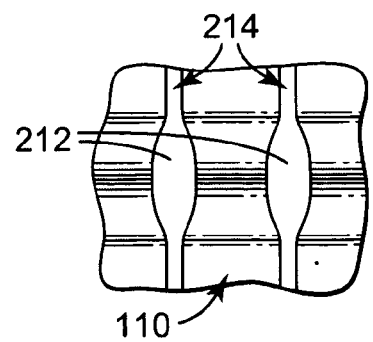
FIG. 3B is a partial enlarged bottom plan view of the composite web of FIG. 2.

One exemplary composite web 200 that may, e.g., be manufactured using the apparatus 100 illustrated in FIG. 1, is shown in FIGS. 2, 3A, and 3B. In addition to the shaped backing 110a, the composite web 200 includes the elongate strands of material 214 that preferably extend in a generally parallel, spaced-apart relationship. The strands 214 may be located such that they are generally orthogonal to the ridges 202 and grooves 204. Alternatively, the strands 214 may not be orthogonal to the ridges 202 and grooves 204.

Each of the strands 214 may, as illustrated, be generally cylindrical where the strands 214 span a groove 204 between ridges 202. Adjacent pairs of strands 214 may also be spaced apart from each other such that each strand 214 includes elongate side surface portions 216 (See FIG. 3A) that are spaced from the elongate side surface portions 216 of adjacent strands 214. Each of the strands 214 may also have corresponding opposite first and second elongate surface portions 218 and 228 extending between opposite elongate side surface portions 216.

The strands 214 are attached to ridges 202 of the shaped backing 110 at anchor portions 212. As discussed herein, the strands 214 may preferably be thermally bonded to the backing 110 at each of the anchor portions 212, with the strands 214 also including elongate portions 218 extending between successive anchor portions 212 in each strand 214. As seen in FIG. 4B, the arcuate portions of the shaped backing 110 thus extend away from the spanning elongate portions 218 between the anchor portions 212. The anchor portions 212 may preferably be spaced about the same distance from each other and aligned in generally parallel rows extending transverse to the strands 214.

Because the strands 214a are extruded in molten form onto the ridges 202 of the shaped backing 110 in some embodiments, the strands 214a can be pressed onto the ridges 202 by the teeth 122 on the first corrugating member 120 (see FIG. 1) and the periphery of the cooling roller 140. As a result, the molten strands 214a may form around and be indented by the corrugating member 120 and the backing 110 such that anchor portions 212 are formed along ridges 202.

As illustrated in FIG. 3B, the anchor portions 212 of the strands 214 may be relatively wide as measured in a direction transverse to the length of the strands 214. That relative width is greater than the width of the strands 214 as measured in the same direction. As a result of the increased width, the area occupied by the strands 214 on the ridges 202 is greater than if the strands 214 were not deformed. That increased area of the anchor portions 212 can help to increase the strength of the bonding between the strands 214 and the backing 110.

Other embodiments of the composite web 200 are also possible. For example, the apparatus 100 used to produce the composite web 200 could include spacing the teeth 122 around the corrugating members 120 and 121 (see FIG. 1) to produce repetitive patterns having different spacing between the anchor portions 212 of the shaped backing 110, thereby providing corrugations with different depths. Similarly, the teeth 122 of the corrugating members 120, 121 could be shaped to produce non-parallel ridges 202 and grooves 204. Further, the shape of the corrugations in the backing 110 could be different than the generally sinusoidal shape seen in the figures, e.g., in the form of semicircles, diamonds, rectangles, or other regular or irregular patterns, through the use of suitable intermeshing corrugating members.

Also, although the illustrative embodiments include strands on only one major surface, it will be understood that strands could be attached to both major surfaces, with the strands on one or both of the major surface being severed as desired. Further, it should be noted that the elongate strands are attached to the surface of the backing, i.e., they do not extend through the backing as, e.g., woven strands would.

The strands of material 214 may be essentially continuous and parallel in the longitudinal or machine direction of the backing 110 as shown in the figures. Alternatively, the strands 214 could extend substantially non-parallel and/or configured such that they are not orthogonal to the ridges 202 and grooves 204, e.g., the elongate strands of material 214 could be angled across the ridges 202 and grooves 204 of the shaped backing 110. Any angle of orientation of 90 degrees or less is possible. However angles of about 30 to about 90 degrees may be typical.

Yet another variation is that the strands 214 are shown as including anchor portions 212 on all of the ridges 202 formed in backing 110. As a result, the strands 214 are attached to each pair of adjacent ridges 202 (with a groove 204 located therebetween). In some embodiments, however, the strands 214 may not be attached to each successive ridge 202. For example, one or more of the strands 214 may be attached to some of the ridges 202, but not each and every successive ridge 202 encountered when moving along the length of the strand 214. In some instances, these variations may be intentional, and in others, manufacturing variability may result in a failure of the strand 214 to attach to each and every ridge 202. In any event, each of the strands 214 preferably spans one groove 204 located between the ridges 202 (whether or not those ridges 202 are adjacent to each other).

Figure 4A:
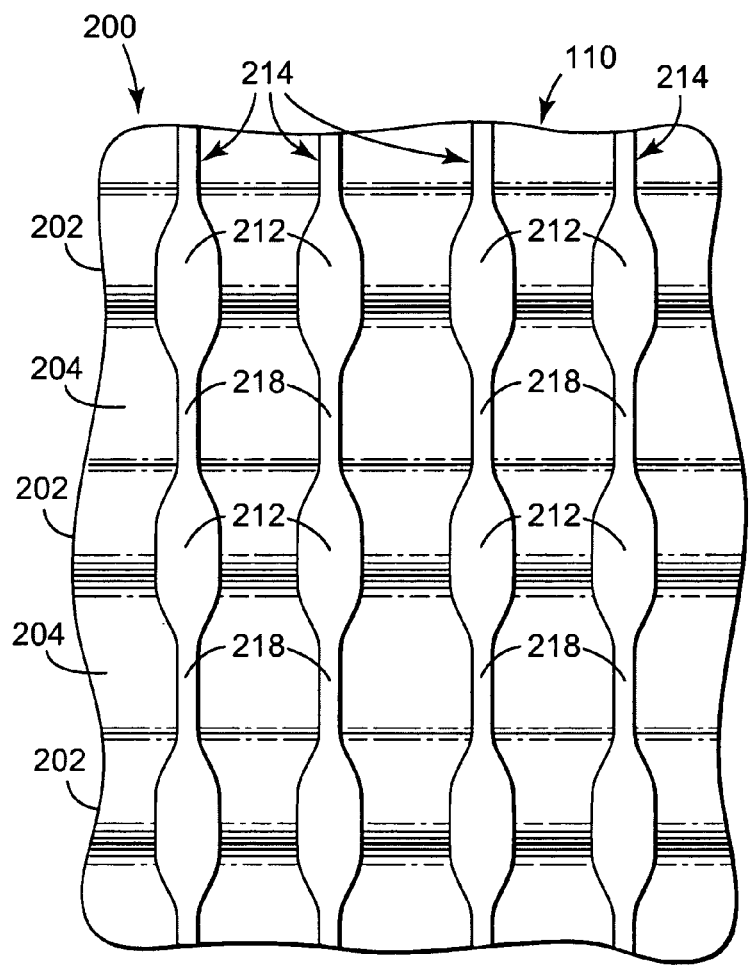
FIG. 4A is another partial bottom plan view of the composite web of FIG. 2.
Figure 4B:
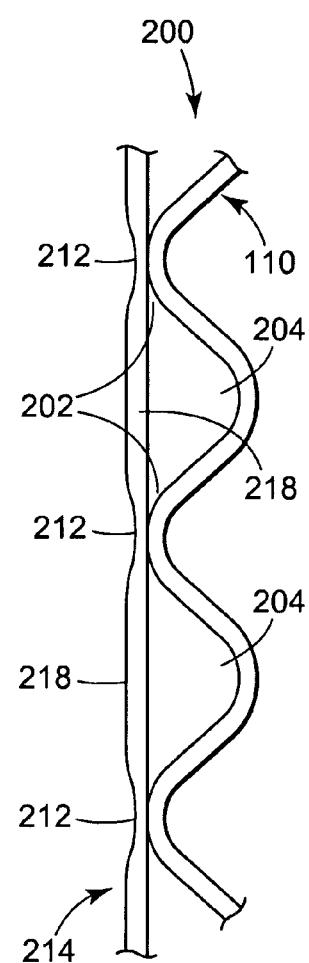
FIG. 4B is a side elevation view of the composite web of FIG. 4A.

FIG. 4A is a partial bottom plan view of the composite web of FIG. 2 with FIG. 4B illustrating a corresponding side elevation view. These views depict the elongate strands of material 214 after attachment to the shaped backing 110. In particular, the strands 214 include anchor portions 212 that, in the depicted embodiment, are attached to the ridges 202. The elongate portions 218 of the strands 214 thus span the grooves 204, where they are attached to anchor portions 212 at ridges 202.

Figure 5A:
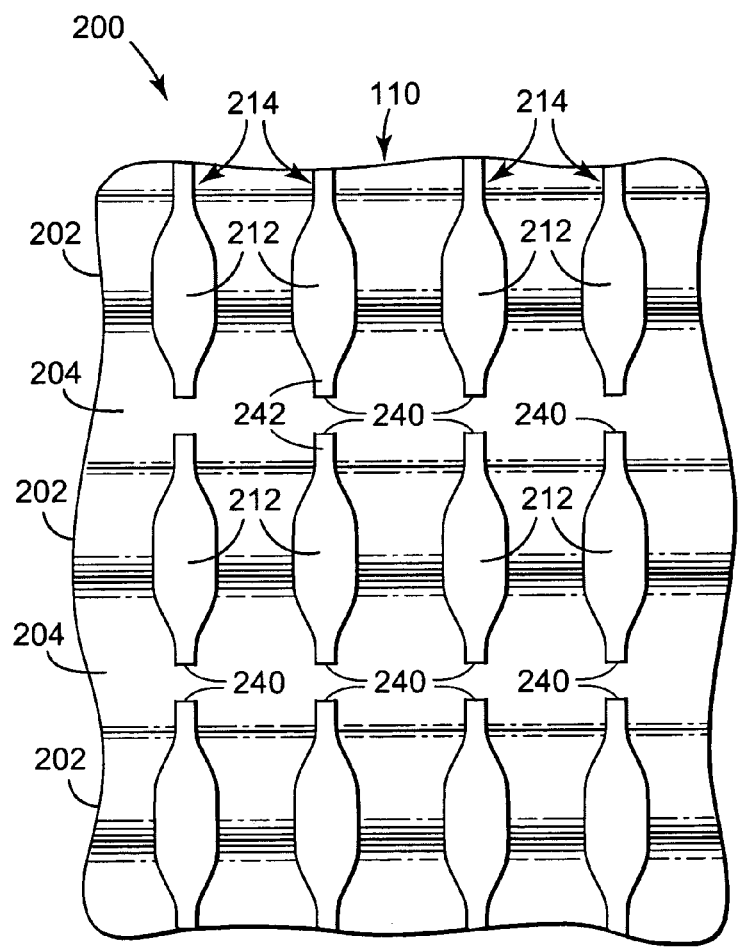
FIG. 5A is a partial bottom plan view of the composite web of FIG. 4A illustrating severed elongate strands in accordance with one embodiment of the invention.
Figure 5B:
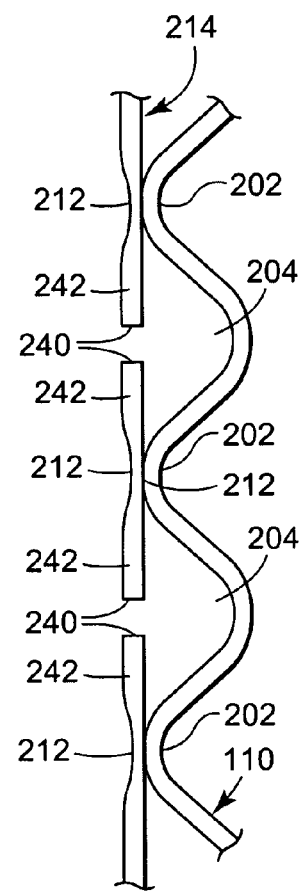
FIG. 5B is a side elevation view of the composite web of FIG. 5A.

After the elongate strands of material 214 are attached to the shaped backing 10 to form the composite web 200, the strands 214 may be severed as generally illustrated in FIGS. 5A and 5B. Severing of the strands 214 preferably occurs between adjacent anchor portions 212 along each strand as shown. In the illustrated embodiment, substantially all the strands 214 are severed between each bonding location, e.g., between each anchor portion 212. That is, the portions 218 of the strands 214 spanning the grooves 204 may be severed such that a severed elongate strand 242 is formed, with the elongate strand 242 having a severed distal tip 240. Preferably, each of the strands 214 is severed across each groove 204 such that the configuration (i.e., the shape) of the shaped backing 110 is no longer constrained by the strands 214.

In some instances, however, not every elongate portion 218 spanning a groove 204 is severed. Web constructions in which some of the elongate portions 218 are not severed may be beneficial in providing loops that can interact with the severed elongate strands 242 if the web construction 200 is to be used as a mechanical fastener. In such devices, a single, unitary web construction can provide both fastening elements (the severed strands 242 that may or may not be processed further by adjusting their orientation and/or shaping their tips as discussed herein) and the loops to which the fastening elements fasten.

To effect severing of the strands 214, the severing device 150 (see FIG. 1) may be used. Such a severing device may utilize contact cutters (e.g., cutting blades 151) or non-contact cutters (e.g., hot air knife, laser) to sever the strands 214 at the desired location. Alternatively, the severing device 150 may score or otherwise weaken the strands 214 at a location between ridges 202 such that as the backing 110 is stretched or flattened, the strands 214 separate at the weakened locations. In another alternative, severing of the strands 214 may be accomplished with a separate process such as via manual methods.

While not shown, the severing device 150 may further include perforating devices to perforate the backing 110 if so desired. Perforations in the backing 110 may include any suitable openings, e.g., slits, voids, holes, etc.

Figure 6A:
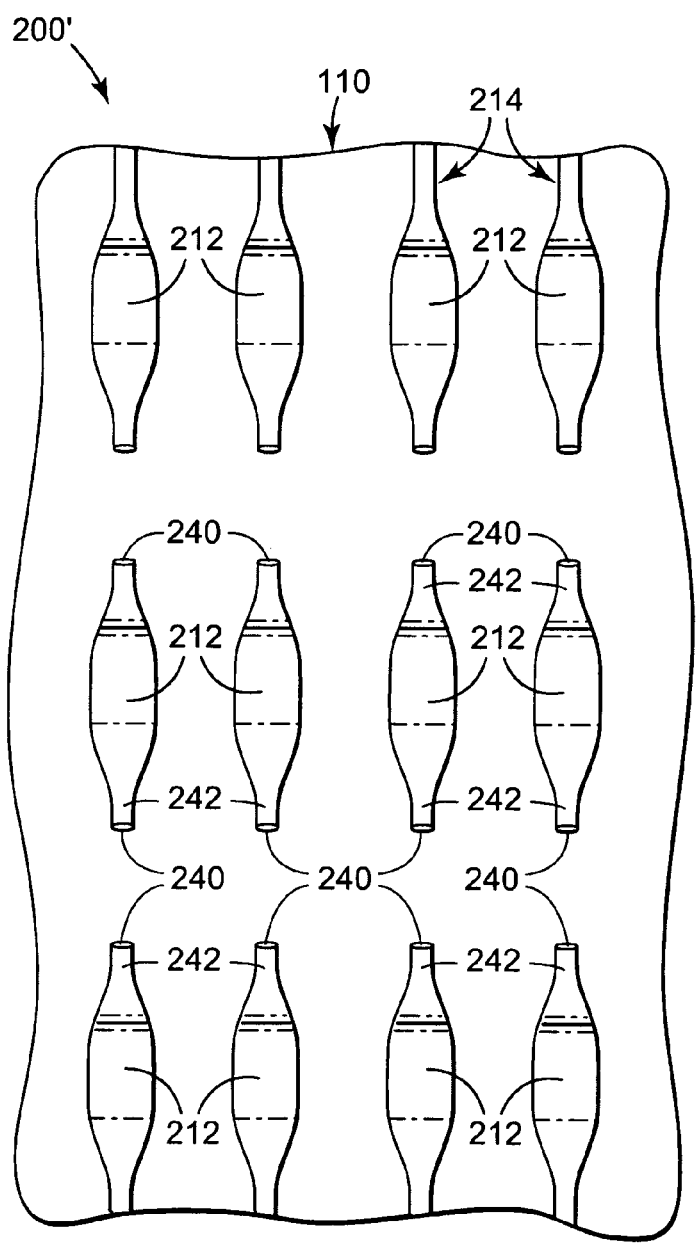
FIG. 6A is a partial bottom plan view of the composite web of FIG. 4A after flattening the composite web.
Figure 6B:
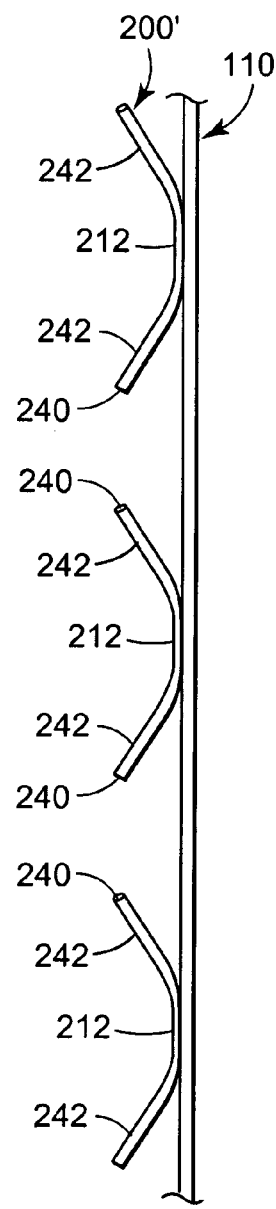
FIG. 6B is a side elevation view of the composite web of FIG. 6A.

After the strands 214 are severed as shown in FIGS. 5A and 5B, the composite sheet may be flattened or stretched as generally illustrated in FIGS. 6A and 6B. That is, the shaped backing 110, now unconstrained by the unsevered strands 214 spanning the ridges 202, may be put under tension or elongated in the direction of the strands 214 to form a generally flat (assuming all the strands 214 are severed between each bond location), sheet-like web 200'. Depending on the material of the backing 110, severing of the strands 214 may result in relaxation of the backing 110 such that it becomes flattened as seen in, e.g., FIGS. 6A & 6B. However, other techniques, e.g., stretching under tension, rolling, heating, wetting, etc., may be utilized to ensure the flat web 200' maintains a flattened shape as depicted in FIG. 6B (if so desired).

When the backing 110 is flattened, the severed strands 214 may form fastening elements with distal tips 240 located at the ends of stems or elongate strands 242 that protrude from the anchor portions 212. In some embodiments, the severed elongate strands 242 may be generally parallel to the localized plane of the backing 110.

In other embodiments, the elongate strands 242 may extend at an included angle from the localized plane formed by the flattened backing 110. The included angle may be 90 degrees or less as illustrated in FIGS. 6B and 8. Angles beyond 90 degrees may also be possible. Various factors contribute to the included angle of the elongate strands 242, e.g., residual stress in the strands 214, localized variation in the backing 110, etc. Various processes, e.g., mechanical manipulation, may be used to adjust the included angle formed between the elongate strands 242 and the localized plane formed by the backing 110.

The elongate strands 242 may have any suitable ratio of length (e.g., the distance from center of the anchor portion 212 to the distal tip 240) to width (e.g., strand diameter). These dimensions may be adjusted to provide articles that include severed elongate strands with selected properties such as thickness, length, stiffness, flexibility, etc. For example, thinner elongate strands 242 may be more flexible than thicker strands 242 constructed of the same materials. In other instances, however, thinner strands 242 may not be more flexible if the thinning is accomplished by stretching that changes the physical properties (e.g., crystallization, etc.) of the material of the strands 242. The properties of the severed elongate strands 242 may be adjusted based on the intended use of the articles, e.g., strands 242 intended for use as spacers in a filtration assembly may preferably be stiffer than, e.g., strands 242 intended for use as polishing articles.

Moreover, while the elongate strands 242 are shown as having a cylindrical shape, e.g., a circular cross-section, other shapes (e.g., strand cross-sections being rectangular, oval, triangular, star, or most any other extruded shape) are certainly possible without departing from the scope of the invention.

The embodiments of FIGS. 5A, 5B, 6A, and 6B illustrate the strands 214 as being severed approximately equidistant from adjacent anchor portions 212. However, other embodiments are also possible. For example, FIGS. 7A and 7B illustrate severing of the strands 314 at a location between a first anchor portion 312a and a second anchor point 312b. The severing is performed between a midpoint 334 of the portion 318 of the strand 314 that spans the groove 304 between adjacent ridges 302 (and corresponding anchor portions 312a and 312b). As a result, the stem or elongate portion 342a is longer (as measured between anchor portion 312a and distal tip 340a) than the stem or elongate portion 342b protruding from anchor portion 312b. In some instances, the anchor portion 312b may not exhibit any useful stem or elongate portion in the direction facing anchor portion 312a.

FIG. 8 illustrates an exemplary fastening element 348 having one stem or elongate portion 342a that is longer than another elongate portion 342b (with both portions 342a and 342b protruding from a common anchor portion 312. Moreover, this figure illustrates that the orientation of the elongate portions may be adjusted such that, e.g., elongate portion 342a forms an included angle 346 of less than 90 degrees (e.g., at an angle of about 30 degrees to about 60 degrees) from the localized plane formed by the flattened backing 310, while elongate portion 342b extends generally orthogonally from the same plane.

Some embodiments may further include shaping the distal tip 340 of one or both of the elongate portions 342a and 342b. For example, FIG. 8 illustrates an exemplary mushroom-shaped protrusion or head 344 on a distal tip 340 of one elongate portion 342a. Such heads may be formed in accordance with methods known in the art, e.g., calendaring. While shown as mushroom-shaped, distal ends having most any shape are possible without departing from the scope of the invention.

Figure 9:
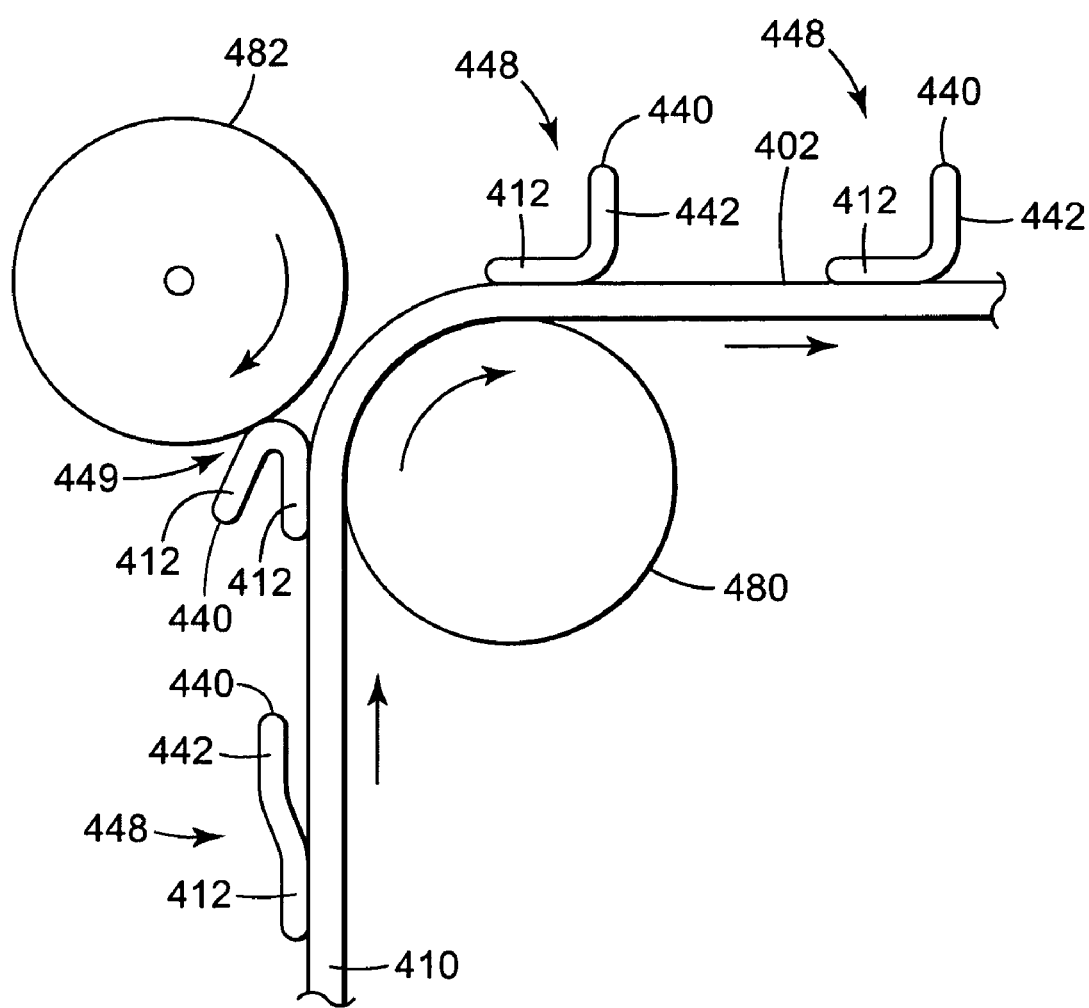
FIG. 9 illustrates a flattened composite web, e.g., that of FIGS. 6A and 7A, configured in an open curve.

In certain embodiments, the stems or elongate portions formed according to the principles of the present invention may be configured to extend at selected orientations with respect to the localized plane of the backing by passing the backing over a relatively small diameter roller. One such process is depicted in FIG. 9 in which a backing 410 passes over roller 480. The backing 410 includes elements 448 located on at least one major surface 402 of backing 410. Each of the elements 448 includes an anchor portion 412 and at least one stem or elongate portion 442 that terminates in a severed distal tip 440.

Merely passing the backing 410 over roller 480 may, in some instances, be sufficient to adjust the orientation of the elongate portions 442 to a selected degree. For example, the diameter of the roller 480 may be selected to at least partially control the angularity of the elongate portions 442 with respect to the backing 410. In addition, FIG. 9 also depicts a second roller 482 rotating such that its surface is moving in the opposite direction from the backing 410 and its elements 448. As a result, the roller 482 may act to physically move the stems or elongated portions 442 of elements 448 such that their orientation with respect to the backing 410 is adjusted. Roller 482 may, in some instances be a solid roll or include bristles or other structures designed to interact with the elongate portions 442. In other instances, it be possible to use a stationary bar, knife edge or other structure to catch and adjust the portions 442 of elements 448. In still other instances, it may sufficient to pass the elements through a jet or stream of fluid to adjust the orientation of the portions 442 with respect to backing 410.

EXAMPLE

The invention may be further illustrated by the following example, but the particular materials and amounts thereof recited in these examples, as well as other conditions and details, should not be construed to unduly limit this invention.

A composite web similar to the web 200 of FIG. 2 was made using equipment similar to that illustrated in FIG. 1. The backing (e.g., backing 110) used was a corrugated nonwoven backing of spunbond-type polypropylene available from Amoco Fabrics and Fibers Company of Austell, Ga., USA, under the designation RFX and having a basis weight of about 30 grams per square meter ($g/m^2$). The first corrugating member 120 was heated to about 93 degrees Centigrade (C); the second corrugating member 121 was at about 149 degrees C., and the cooling roller 140 was at about 21 degrees C. The line speed was about 18 meters per minute.

Approximately three linear corrugations per centimeter were formed. The anchor portions (212 of FIG. 2) were spaced from each other along the length of the strands 214 by a distance of, on average, about 3 millimeters (mm). The resulting nonwoven backing had arcuate nonwoven portions extending from the strands 214 (see FIGS. 2 and 3A).

The strands 214 were formed, using an extruder similar to the extruder 130 of FIG. 1, from a thermoplastic ethylene-propylene impact copolymer at a basis weight of about 50 $g/m^2$. The copolymer material is commercially available under the designation 7C50 from The Dow Chemical Company of Midland, Mich., USA. Substantially parallel inelastic strands were produced at approximately 9.4 strands per centimeter. The melt temperature in the extruder 130 was at about 260 degrees C.

The strands were extruded to the corrugated nonwoven backing at about 7.5 bonds per inch. Each of the strands were then severed between each anchor portion with a razor blade and the backing was flattened to produce a web having upstanding protrusions thereon as shown and described herein.

The complete disclosure of the patents, patent documents, and publications cited herein are incorporated by reference in their entirety as if each were individually incorporated.

Exemplary embodiments of the present invention are described above. Those skilled in the art will recognize that many embodiments are possible within the scope of the invention. Other variations, modifications, and combinations of the various parts and assemblies can certainly be made and still fall within the scope of the invention. Thus, the invention is limited only by the following claims, and equivalents thereto.

What is claimed is:

1. A method of making a web construction with severed elongate strands, the method comprising:
   providing a continuous backing comprising two opposing major surfaces, the backing comprising alternating ridges and grooves on one major surface of the two opposing major surfaces;
   attaching a plurality of elongate inelastic stands to two or more ridges of the alternating ridges and grooves; and
   severing the plurality of elongate strands at locations between the two or more ridges without severing the backing to form severed elongate strands on the continuous backing.

2. The method of claim 1, wherein each elongate strand of the plurality of elongate strands spans a portion of at least one groove located between two adjacent ridges of the alternating ridges and grooves.

3. The method of claim 1, further comprising flattening the backing.

4. The method of claim 1, wherein the backing comprises a foraminous backing.

5. The method of claim 1, wherein the backing comprises a fibrous backing.

6. The method of claim 1, further comprising adjusting the orientation of the severed elongate strands relative to a localized plane of the backing.

7. The method of claim 1, wherein each of the severed elongate strands comprises a distal tip, and wherein the method further comprises shaping the distal tip on at least some of the severed elongate strands.

8. The method of claim 1, wherein attaching each of the plurality of elongate strands comprises extruding a constant linear volume of strand material onto at least the two or more ridges.

9. The method of claim 1, wherein severing the plurality of elongate strands comprises cutting the plurality of elongate strands with a cutting blade.

10. The method of claim 1, further comprising perforating the backing while severing the plurality of elongate strands.

11. A method of making fastening elements, the method comprising:
    providing a backing comprising two opposing major surfaces, the backing comprising alternating ridges and grooves on one major surface of the two opposing major surfaces;
    attaching a plurality of elongate strands to two or more ridges of the alternating ridges and grooves, wherein the plurality of strands are attached to at least one of the major surfaces of the backing; and
    severing the plurality of elongate strands at locations between the two or more ridges to form fastening elements, wherein each fastening element comprises an anchor portion attached to the backing, at least one severed elongate strand protruding from the anchor portion, and a severed distal tip on the at least one elongate strand.

12. The method of claim 11, further comprising flattening the backing after severing the plurality of elongate strands.

13. The method of claim 11, further comprising adjusting the orientation of the severed elongate strand of at least some of the fastening elements with respect to the backing.

14. The method of claim 11, further comprising shaping the distal tip of at least some of the fastening elements.

15. The method of claim 14, wherein the shaping comprises forming a mushroom-shaped head.

16. The method of claim 11, wherein severing the plurality of elongate strands comprises severing the plurality of elongate strands approximately equidistant from adjacent ridges of the plurality of alternating ridges and grooves.

17. The method of claim 11, further comprising extruding the plurality of elongate strands onto the backing.

18. The method of claim 11, wherein the backing comprises a fibrous backing.

19. The method of claim 11, wherein the severed elongate strands are inelastic.

20. A method of making fastening stems for use with a hook-and-loop fastener, the method comprising:
    corrugating a backing to form a plurality of alternating ridges and grooves on a first major surface of the backing;
    extruding a plurality of elongate strands onto the first major surface of the backing, wherein each of the plurality of elongate strands attach to the backing at anchor portions, the anchor portions located on or near some or all of the ridges of the plurality of alternating ridges and grooves, wherein most or all of the plurality of elongate strands span the grooves of the plurality of alternating ridges and grooves;
    severing the plurality of elongate strands between adjacent ridges of the plurality of alternating ridges and grooves, where a plurality of severed elongate strands are formed; and
    flattening the backing, wherein the plurality of severed elongate strands form fastening stems attached to the backing.

21. The method of claim 20, further comprising shaping a distal tip of at least some of the severed elongate strands after the severing.

22. The method of claim 20, wherein each of the plurality of elongate strands are generally parallel to one another and further wherein each of the plurality of elongate strands are generally orthogonal to the plurality of alternating ridges and grooves.

23. The method of claim 20, further comprising adjusting the orientation of the severed elongate strands relative to a localized plane of the backing.

24. The method of claim 20, wherein lengths of the severed elongate strands are equal.

* * * * *

UNITED STATES PATENT AND TRADEMARK OFFICE
CERTIFICATE OF CORRECTION

| | | |
|---|---|---|
| PATENT NO. | : 7,052,565 B2 | Page 1 of 1 |
| APPLICATION NO. | : 10/351907 | |
| DATED | : May 30, 2006 | |
| INVENTOR(S) | : Seth, Jayshree | |

It is certified that error appears in the above-identified patent and that said Letters Patent is hereby corrected as shown below:

TITLE PG, ITEM (56) Col. 2 (U.S. Patent Documents) - Line 6 - Delete "Miner et al." and insert - - Milner et al. - -, therefor.

TITLE PG, ITEM (56) Col. 2 (Foreign Patent Documents) - Line 4 - Delete "WI 00/44971" and insert - - WO 00/44971 - -, therefor.

Column 4 – Line 8 - Delete "10a" and insert - - 110a - -, therefor.

Column 6 – Line 51 - Delete "preformed" and insert - - pre-formed - -, therefor.

Column 8 – Line 57 - Delete "10" and insert - - 110 - -, therefor.

Column 10 – Line 34 - After "342b" delete "(".

Column 12 – Line 8 (Approx.) - In Claim 1, delete "stands" and insert - - strands - -, therefor.

Signed and Sealed this

Fifteenth Day of August, 2006

JON W. DUDAS
*Director of the United States Patent and Trademark Office*